United States Patent
Teck et al.

(10) Patent No.: US 9,007,993 B2
(45) Date of Patent: Apr. 14, 2015

(54) METHOD FOR INTER-BASE STATION SIGNALING

(75) Inventors: Hu Teck, Melbourne, FL (US);
Matthew Baker, Canterbury (GB);
Hakon Helmers, Velizy (FR)

(73) Assignee: Alcatel Lucent, Boulogne-Billancourt (FR)

( * ) Notice: Subject to any disclaimer, the term of this patent is extended or adjusted under 35 U.S.C. 154(b) by 831 days.

(21) Appl. No.: 13/289,404

(22) Filed: Nov. 4, 2011

(65) Prior Publication Data

US 2012/0147826 A1 Jun. 14, 2012

Related U.S. Application Data

(60) Provisional application No. 61/410,563, filed on Nov. 5, 2010.

(51) Int. Cl.
| | |
|---|---|
| *H04W 4/00* | (2009.01) |
| *H04W 52/36* | (2009.01) |
| *H04W 52/24* | (2009.01) |
| *H04W 72/12* | (2009.01) |
| *H04W 92/20* | (2009.01) |

(52) U.S. Cl.
CPC .......... *H04W 52/367* (2013.01); *H04W 52/244* (2013.01); *H04W 72/1289* (2013.01); *H04W 92/20* (2013.01); *Y02B 60/50* (2013.01)

(58) Field of Classification Search
USPC .......................................... 370/254, 328, 329
See application file for complete search history.

(56) References Cited

U.S. PATENT DOCUMENTS

| | | | |
|---|---|---|---|
| 8,559,343 B2* | 10/2013 | Parkvall et al. ............... | 370/280 |
| 2009/0252077 A1* | 10/2009 | Khandekar et al. ........... | 370/312 |
| 2011/0255484 A1* | 10/2011 | Zhang et al. .................. | 370/329 |
| 2012/0082052 A1* | 4/2012 | Oteri et al. .................... | 370/252 |
| 2012/0202540 A1* | 8/2012 | Lee et al. ....................... | 455/501 |
| 2013/0039185 A1* | 2/2013 | Teyeb et al. ................... | 370/235 |
| 2013/0040688 A1* | 2/2013 | Mizusawa ..................... | 455/522 |
| 2013/0272259 A1* | 10/2013 | Kim et al. ..................... | 370/329 |
| 2014/0126386 A1* | 5/2014 | Beale ............................ | 370/252 |
| 2014/0269597 A1* | 9/2014 | Park et al. ..................... | 370/329 |
| 2014/0293914 A1* | 10/2014 | Maattanen et al. ........... | 370/329 |
| 2014/0321303 A1* | 10/2014 | Iyer et al. ...................... | 370/252 |

* cited by examiner

*Primary Examiner* — Farah Faroul
(74) *Attorney, Agent, or Firm* — Harness, Dickey & Pierce

(57) ABSTRACT

One embodiment of a method for inter-base station signaling includes receiving, at a first base station, first information from a second base station. The first information indicates commitments regarding transmission power by the second base station. The embodiment further includes determining, at the first base station, whether the second base station will follow the commitments indicated in the first infatuation based on second information. The second information indicates for at least one of the first and second base stations which subframes in a series of subframes will be special subframes. Each special subframe has at least one of less transmit power than a maximum transmission power and less data than a fully loaded subframe.

23 Claims, 7 Drawing Sheets

METHOD FOR INTER-BASE STATION SIGNALING

PRIORITY INFORMATION

This application claims priority under 35 U.S.C. 119 to Provisional Application No. 61/410,563, filed Nov. 5, 2010; the entire contents of which are hereby incorporated by reference.

BACKGROUND OF THE INVENTION

Heterogeneous networks (HetNets or HTNs) are now being developed wherein cells of smaller size are embedded within the coverage area of larger macro cells and the small cells could even share the same carrier frequency with the umbrella macro cell, primarily to provide increased capacity in targeted areas of data traffic concentration. Such heterogeneous networks try to exploit the spatial variations in user (and traffic) distribution to efficiently increase the overall capacity of the wireless network. Those smaller-sized cells are typically referred to as pico cells or femto cells, and for purposes of the description herein will be collectively referred to as small cells. Such deployments present some specific interference scenarios for which enhanced inter-cell interference coordination (ICIC) techniques would prove beneficial.

In one scenario, the small cells are picocells, which are open to users of the macrocellular network. In order to ensure that such picocells carry a useful share of the total traffic load, user equipments (UEs) may be programmed to associate preferentially with the picocells rather than the macrocells, for example by biasing the SINR threshold at which they will select a picocell to associate with. Under such conditions, UEs near the edge of a picocell's coverage area will suffer strong interference from one or more macrocells. In order to alleviate such interference, some subframes may be configured as "blank" or "almost blank" in the macrocell. A blank subframe contains no transmission from the macrocell. An "almost blank" subframe is a subframe with reduced transmit power (e.g., reduced from a maximum transmit power) and/or a reduced activity subframe (e.g., contains less data than a fully loaded subframe). Legacy UEs (also called terminals) expect to find the reference signals for measurements but are unaware of the configuration of these special subframes. Almost blank subframes may also contain synchronization signals, broadcast control information and/or paging signals.

In order to make use of blank or almost blank subframes (ABSs) effective (note that hereafter the term "special" or "ABS" is used, and should be understood to include both blank and almost blank subframes), signaling is provided from the macrocell to the picocell across the corresponding backhaul interface, known in LTE as the "X2" interface. For LIE Release 10, it has been agreed that this X2 signaling will take the faun of a coordination bitmap to indicate the ABS pattern (for example with each bit corresponding to one subframe in a series of subframes, with the value of the bit indicating whether the subframe is an ABS or not). Such signaling can help the picocell to schedule data transmissions in the picocell appropriately to avoid interference (e.g. by scheduling transmissions to UEs near the edge of the picocell during ABSs), and to signal to the UEs the subframes which should have low macrocellular interference and should therefore be used for RRM/RLM/CQI measurements. (RRM=Radio Resource Management, typically relating to handover; RLM=Radio Link Monitoring, typically relating to detection of serving radio link failure; CQI=Channel Quality Information, derived from the signal strength from the serving cell and the interference from other cells, and typically used for link adaptation and scheduling on the serving radio link).

In Rel-10, the downlink Relative Narrowband Tx Power indicator (DL-RNTP) is defined in TS36.423 in Section 9.2.19. It provides an indication of any DL transmission power restrictions in the cell per resource block in the frequency domain. This information is sent over the X2 interface to a neighbor cell (e.g., base station or eNodeB) so that the neighbor cell may use the information for its own interference aware scheduling. Currently, no methods for cooperatively addressing/handling the ABS and the RNTP information exist.

SUMMARY OF THE INVENTION

At least one example embodiments addresses the interaction between the RNTP information and the ABS information.

One embodiment of a method for inter-base station signaling includes receiving, at a first base station, first information from a second base station. The first information indicates commitments regarding transmission power by the second base station. The embodiment further includes determining, at the first base station, whether the second base station will follow the commitments indicated in the first information based on second information. The second information indicates for at least one of the first and second base stations which subframes in a series of subframes will be special subframes. Each special subframe has at least one of less transmit power than a maximum transmission power and less data than a fully loaded subframe.

In one embodiment, the determining is based on pre-set rules stored at the first base station. For example, the determining determines that the second base station will not follow the commitments indicated in the first information during the special subframes indicated by the second information.

In one embodiment, the first information includes a bit corresponding to each one of a plurality of physical resource blocks. Each bit indicates whether the second base station will restrict transmission power below a threshold during the corresponding physical resource block. The second information includes a bit map. Each bit in the bit map corresponds to respective one of the subframes in the series of subframes, and each bit indicates whether the corresponding subframe is a special subframe.

In one embodiment, the second information is received from the second base station, and the method further includes scheduling, at the first base station, transmission to user equipment based on the first and second information.

In another embodiment, the method further includes receiving, at the first base station, third information. The third information indicates how to cooperatively handle the first and second information. Here, the determining determines whether the second base station will follow the commitments indicated in the first information based on the second information and the third information. For example, the third information indicates whether to disregard restrictions indicated by the second information during the special subframes indicated by the first information.

In another embodiment, the second information is received from the second base station, and the method further includes scheduling, at the first base station, transmission to user equipment based on the first, second, and third information.

Another embodiment of the method for inter-base station signaling includes sending, from a first base station, handling information to a second base station. The handling information indicates how to cooperatively handle first information and second information. The first information indicates commitments regarding transmission power by the first base station. The second information indicates for at least one of the first and second base stations which subframes in a series of subframes will be special subframes. Each special subframe has at least one of less transmit power than a maximum transmission power and less data than a fully loaded subframe.

In one embodment, the handling information indicates whether to disregard the second information during the special subframes.

In a further embodiment, the method for inter-base station signaling includes sending, at a first base station, first information to a second base station. The first information indicates commitments regarding transmission power by the first base station. The embodiment further includes determining, at the first base station, whether to follow the commitments indicated in the first information based on second information. The second information indicates for the second base station which subframes in a series of subframes will be special subframes. Each special subframe has at least one of less transmit power than a maximum transmission power and less data than a fully loaded subframe.

In one embodiment, the determining is based on pre-set rules stored at the first base station. For example, the determining determines not to follow the commitments indicated in the first information during the special subframes indicated by the second information.

In another embodiment, the method further includes receiving, at the first base station, third information. The third information indicates how to cooperatively handle the first and second information. Here, the determining determines whether to follow the commitments indicated in the first information based on the second information and the third information.

In any of the above described embodiment, the first base station is one of a macro cell base station and a small cell base station, and the second base station is one of a macro cell base station and a small cell base station.

In any of the above described embodiment, the information is sent and received over an X2 interface.

BRIEF DESCRIPTION OF THE DRAWINGS

The example embodiments will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
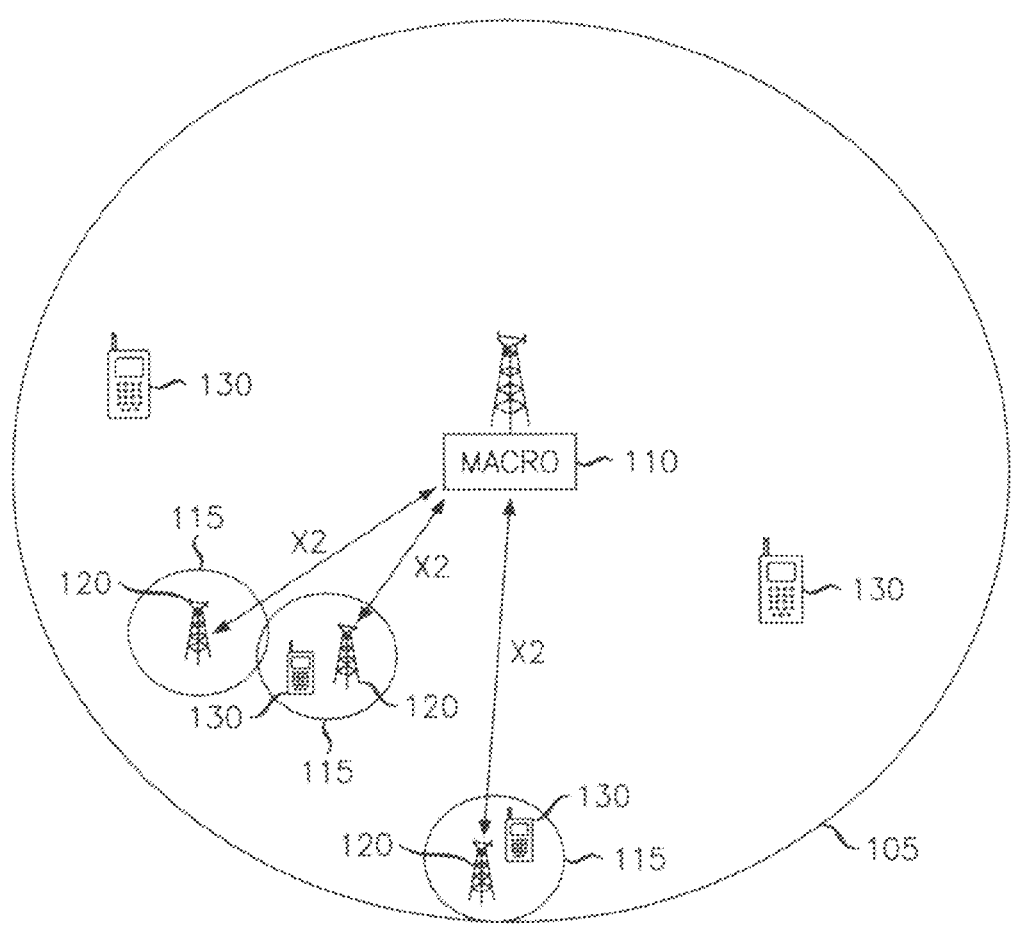
FIG. 1 illustrates a portion of a wireless communication system according to an embodiment.

Various example embodiments will now be described more fully with reference to the accompanying drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular fauns disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such infoi illation storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Note also that the software implemented aspects of example embodiments are typically encoded on some fat in of tangible (or recording) storage medium or implemented over some type of transmission medium. As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Further more, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "user equipment" or "UE" may be synonymous to a mobile user, mobile station, mobile terminal, user, subscriber, wireless terminal, terminal, and/or remote station and may describe a remote user of wireless resources in a wireless communication network. Accordingly, a UE may be a wireless phone, wireless equipped laptop, wireless equipped appliance, etc.

The term "base station" may be understood as a one or more cell sites, base stations, nodeBs, enhanced NodeBs (eNodeB), access points, and/or any terminus of radio frequency communication. Although current network architectures may consider a distinction between mobile/user devices and access points/cell sites, the example embodiments described hereafter may also generally be applicable to architectures where that distinction is not so clear, such as ad hoc and/or mesh network architectures, for example.

Communication from the base station to the UE is typically called downlink or forward link communication. Communication from the UE to the base station is typically called uplink or reverse link communication.

Architecture

FIG. 1 illustrates a portion of a HetNet according to an embodiment. As shown, the HetNet includes a macro cell 105 served by a macro base station 110. The macro cell and macro base station may both be referred to as a macro cell or a macro. The macro cell includes a number of small cells 115 served by respective small cell base stations 120. In one embodiment, the macro and small cells are Long Term Evolution (LIE) macro and small cells. However, the embodiments are not limited to this radio access technology (RAT), and the macro and small cells may be of different RATs. Furthermore, the macro base station 110 and the small cell base stations 120 communicate with each other over X2 interfaces as shown in FIG. 1. UEs 130 may be present in the macro and small cells.

Figure 2:
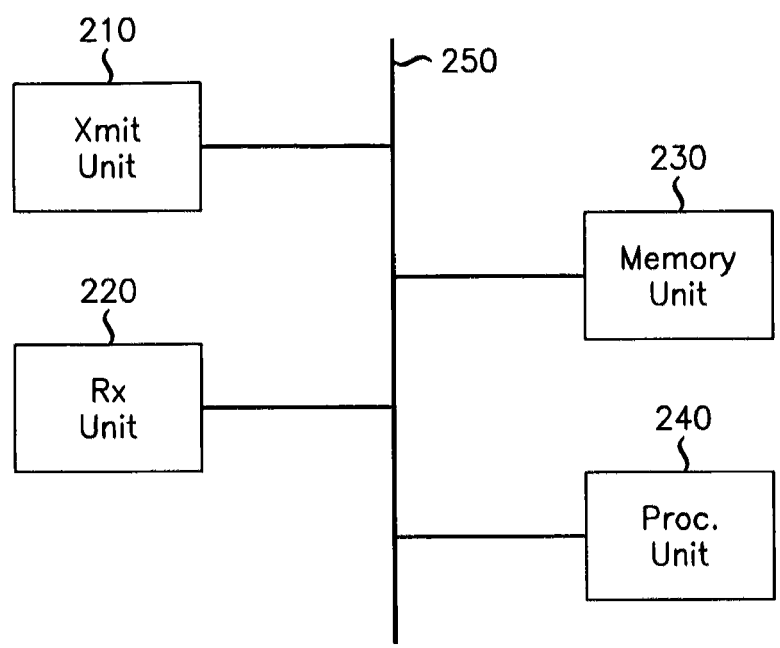
FIG. 2 is a diagram illustrating an example structure of a wireless device.

FIG. 2 is a diagram illustrating an example structure of a wireless device. The wireless device may be a user equipment (UE) or a base station. The wireless device may include, for example, a transmitting unit 210, a receiving unit 220, a memory unit 230, a processing unit 240, and a data bus 250.

The transmitting unit 210, receiving unit 220, memory unit 230, and processing unit 240 may send data to and/or receive data from one another using the data bus 250. The transmitting unit 210 is a device that includes hardware and any necessary software for transmitting wireless signals including, for example, data signals, control signals, and signal strength/quality information via one or more wireless connections to other wireless devices.

The receiving unit 220 is a device that includes hardware and any necessary software for receiving wireless signals including, for example, data signals, control signals, and signal strength/quality information via one or more wireless connections from other wireless devices, The memory unit 230 may be any storage medium capable of storing data including magnetic storage, flash storage, etc.

The processing unit 240 may be any device capable of processing data including, for example, a microprocessor configured to carry out specific operations based on input data, or capable of executing instructions included in computer readable code.

For example, the processing unit 240 is capable of implementing the methods described in detail below.

Operation

Embodiments of methods for inter-base station signaling will now be described.

Figure 3:
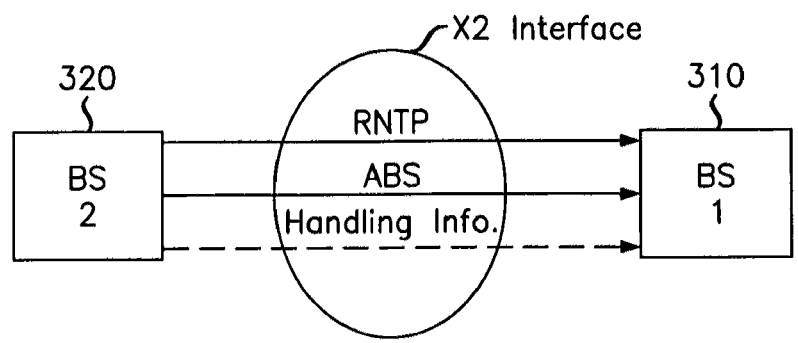
FIG. 3 illustrates a first scenario for explaining embodiments of a method for inter-base station signaling.

FIG. 3 illustrates a first scenario for explaining embodiments of a method for inter-base station signaling. As shown, a first base station 310 receives the RNTP and ABS information from a second base station 320 over an X2 interface. The first base station 310 may be a macro cell base station or a small cell base station. The first base station 310 may have the structure described above with respect to FIG. 2. Similarly, the second base station 320 may be a macro cell base station or a small cell base station. The second base station 320 may have the structure described above with respect to FIG. 2.

In the scenario of FIG. 3, the same base station is the source of both the ABS and RNTP information. As is known, the RNTP information indicates commitments regarding downlink transmission power by the sending base station. For example, if an RNTP bit for a PRB is set to 0, this represents a commitment by the second base station 320 not to raise the transmission (Tx) power beyond the RNTP threshold in the corresponding PRBs in the frequency domain. When the RNTP bit is set to 1, the second base station 320 makes no promise about the transmission power in the corresponding PRBs in the frequency domain. As is also known, the ABS information indicates which subframes in a series of subframes will be Blank or Almost Blank Subframes in transmissions by the sending base station. Namely, the ABS information indicates which subframes in the series of subframes are special subframes and have reduced transmission power (e.g., less than a maximum transmit power) and/or reduced activity (e.g., less data than a fully loaded subframe). For example, in the ABS information, if the bitmap is set to "1", this represents an ABS for the downlink transmission by the second base station 320.

As further shown in FIG. 3, the first base station 310 may, optionally, additionally receive handling information from the second base station 320. The handling information indicates how to cooperatively handle the received RNTP and ABS information.

Figure 4:
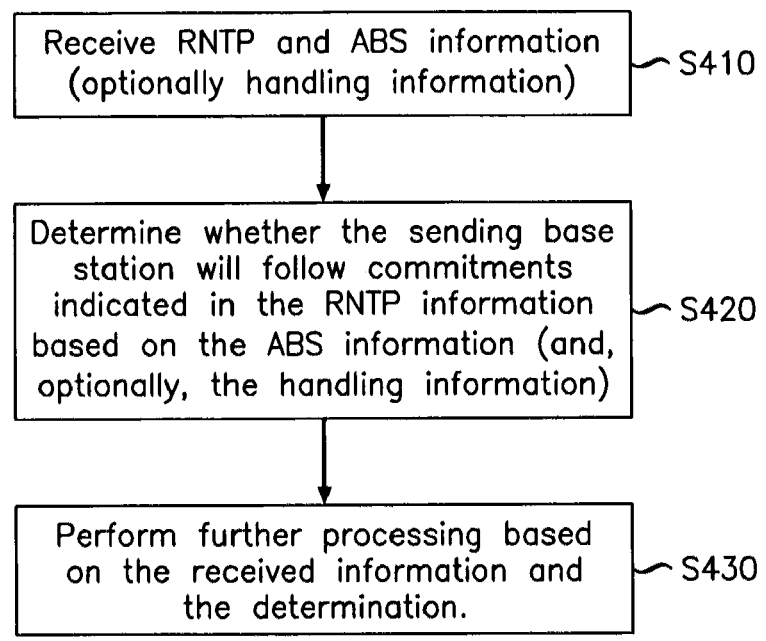
FIG. 4 illustrates an embodiment of a method for inter-base station signaling, which will be described with respect to the first scenario of FIG. 3.

FIG. 4 illustrates an embodiment of a method for inter-base station signaling, which will be described with respect to the first scenario of FIG. 3. As shown, in step S410, the first base station 310 (e.g., the processing unit 250) receives the RNTP and ABS information from the second base station 320. Then, in step S420, the first base station 310 determines whether the second base station 320 will follow the commitments indicated in the RNTP infoi illation based on the ABS information. For example, the first base station 310 may be programmed according to pre-set rules to determine that the second base station 320 will not follow the commitments indicated in the RNTP information during the ABS subframes indicated by the ABS information.

As another example, if the first base station 310 receives the handling information, the first base station 310 determines whether the second base station 320 will follow the commitments indicated in the RNTP infatuation based on the ABS information and the handling information. In particular, the handling information may be an indicator that indicates whether to disregard restrictions indicated by the RNTP information during the special subframes indicated by the ABS information.

Next, in step S430, the first base station 310 may use this received information and the above determination in further processing. For example, the first base station 310 may schedule transmissions to UEs, and/or may signal which subframes for UEs to make measurements. For example as described above, such signaling can help a small cell base station to schedule data transmissions in the small cell appropriately to avoid interference (e.g. by scheduling transmissions to UEs near the edge of the picocell during ABSs), and to signal to the UEs the subframes which should have low macrocellular interference and should therefore be used for RRM/RLM/CQI measurements. (RRM=Radio Resource Management, typically relating to handover; RLM=Radio Link Monitoring, typically relating to detection of serving radio link failure; CQI=Channel Quality Information, derived from the signal strength from the serving cell and the interference from other cells, and typically used for link adaptation and scheduling on the serving radio link).

Figure 5:
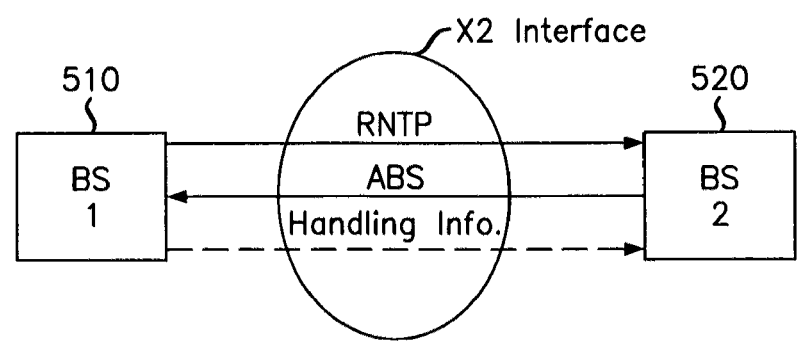
FIG. 5 illustrates a second scenario for explaining embodiments of a method for inter-base station signaling.

FIG. 5 illustrates a second scenario for explaining embodiments of a method for inter-base station signaling. As shown, a first base station 510 sends RNTP information to a second base station 520 over an X2 interface, and receives ABS information from the second base station 520 over the X2 interface. The first base station 510 may be a macro cell base station or a small cell base station. The first base station 510 may have the structure described above with respect to FIG. 2. Similarly, the second base station 520 may be a macro cell base station or a small cell base station. The second base station 520 may have the structure described above with respect to FIG. 2.

As further shown in FIG. 5, the first base station 510 may, optionally, additionally send handling information to the second base station 520. The handling information indicates how to cooperatively handle the RNTP information with respect to the ABS information sent by the second base station 520.

Figure 6:
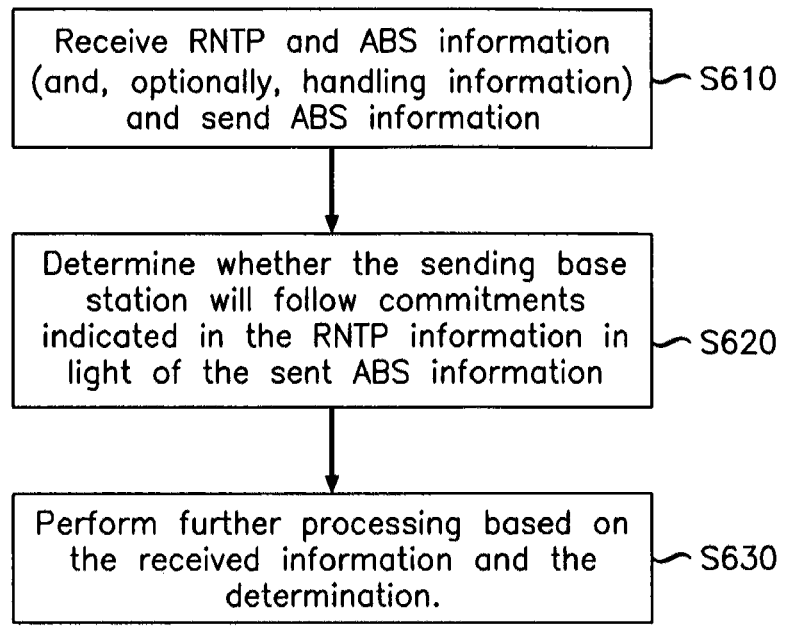
FIG. 6 illustrates an embodiment of a method for inter-base station signaling, which will be described with respect to the second scenario of FIG. 5.

FIG. 6 illustrates an embodiment of a method for inter-base station signaling, which will be described with respect to the second scenario of FIG. 5. As shown, in step S610, the second base station 520 (e.g., the processing unit 250) receives the RNTP information from the first base station 510. Then, in step S620, the second base station 320 determines whether the first base station 510 will follow the commitments indicated in the RNTP information in light of the ABS information sent by the second base station 520. For example, the second base station 520 may be programmed according to pre-set rules to determine that the first base station 510 will not follow the commitments indicated in the RNTP information during the ABS subframes indicated by the ABS information sent by the second base station 520.

As another example, if the second base station 520 receives the handling information, the second base station 520 determines whether the first base station 510 will follow the commitments indicated in the RNTP information in light of ABS information sent by the second base station 520 and the handling information. In particular, the handling information may be an indicator that indicates whether to disregard restrictions indicated by the RNTP information during the special subframes indicated by the ABS information from the second base station 520.

Next, in step S630, the second base station 520 may use this received information and above determination in further processing. For example, the first base station 520 may schedule transmissions to UEs, and/or may signal which subframes for UEs to make measurements. For example as described above, such signaling can help a small cell base station to schedule data transmissions in the small cell appropriately to avoid, and to signal to the UEs the subframes which should have low macrocellular interference and should therefore be used for RRM/RLM/CQI measurements. (RRM=Radio Resource Management, typically relating to handover; RLM=Radio Link Monitoring, typically relating to detection of serving radio link failure; CQI=Channel Quality Information, derived from the signal strength from the serving cell and the interference from other cells, and typically used for link adaptation and scheduling on the serving radio link).

In this embodiment, the first base station 510 sends handling information indicating how to cooperatively handle RNTP information from the first base station 510 in light of the ABS infoi illation from the second base station 520. Accordingly, the first base station 510 may also conduct further processing as described above based on these indications.

Figure 7:
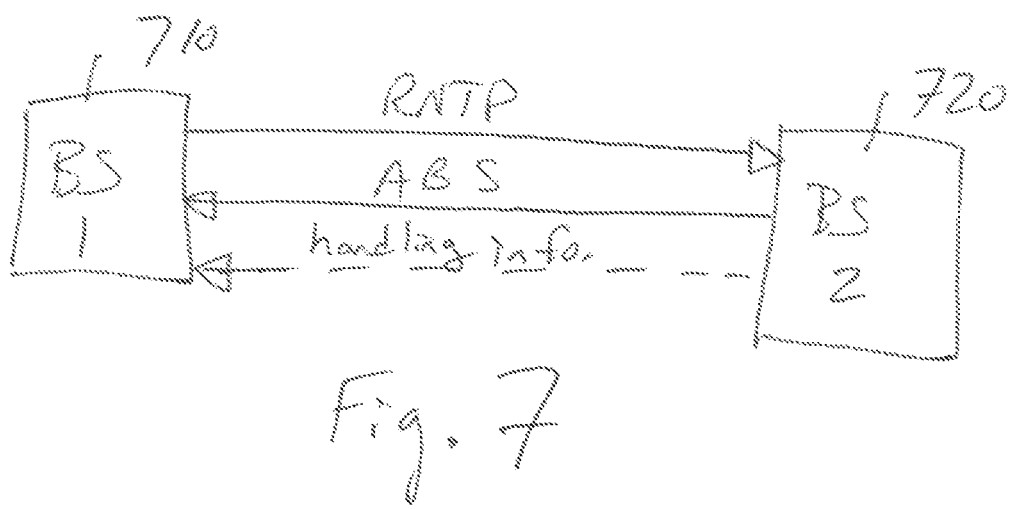
FIG. 7 illustrates a third scenario for explaining embodiments of a method for inter-base station signaling.

FIG. 7 illustrates a third scenario for explaining embodiments of a method for inter-base station signaling. As shown, a first base station 710 sends RNTP information to a second base station 720 over an X2 interface, and receives ABS information from the second base station 720 over the X2 interface. The first base station 710 may be a macro cell base station or a small cell base station. The first base station 710 may have the structure described above with respect to FIG. 2. Similarly, the second base station 720 may be a macro cell base station or a small cell base station. The second base station 720 may have the structure described above with respect to FIG. 2.

As further shown in FIG. 7, the first base station 710 may, optionally, additionally receive handling information from the second base station 720. The handling information indicates how to cooperatively handle the RNTP information with respect to the ABS information sent by the second base station 720.

Figure 8:
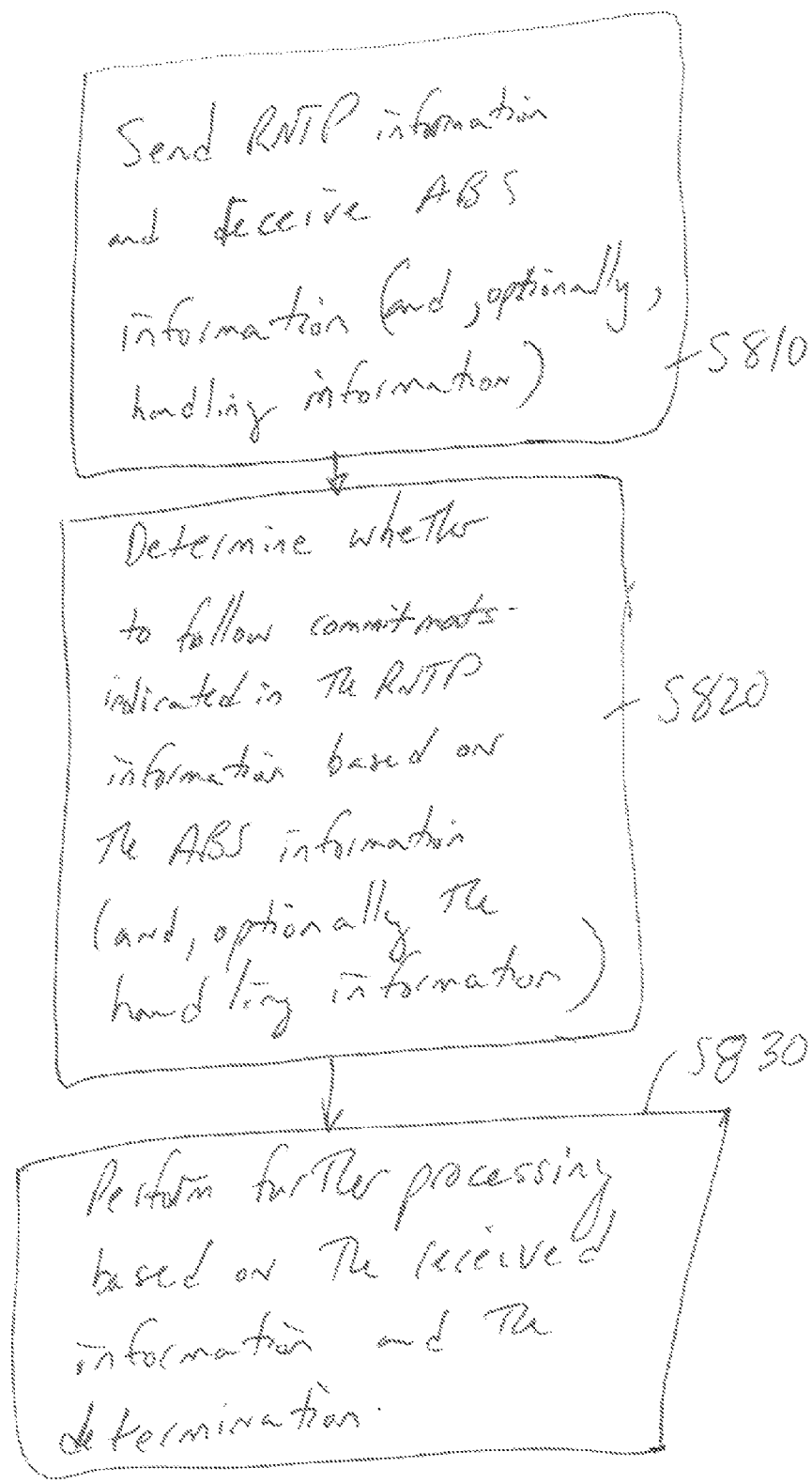
FIG. 8 illustrates an embodiment of a method for inter-base station signaling, which will be described with respect to the third scenario of FIG. 7.

FIG. 8 illustrates an embodiment of a method for inter-base station signaling, which will be described with respect to the third scenario of FIG. 7. As shown, in step S810, the first base station 710 (e.g., the processing unit 250) sends the RNTP information to the second base station 720 and receives ABS information from the second base station 720. Then, in step S820, the first base station 710 determines whether to follow the commitments indicated in the sent RNTP information based on the received ABS information. For example, the first base station 710 may be programmed according to pre-set rules to not follow the commitments indicated in the RNTP information during ABS subframes indicated by the ABS information.

As another example, if the first base station 710 receives the handling information, the first base station 710 determines whether to follow the commitments indicated in the sent RNTP information based on the received ABS information and the handling information. In particular, the handling infoi illation may be an indicator that indicates whether to disregard restrictions indicated by the sent RNTP information during the special subframes indicated by the received ABS information.

Next, in step S830, the first base station 710 may use this received information and the above determination in further processing such as described previously.

The example embodiments being thus described, it will be obvious that the same may be varied in many ways. Such variations are not to be regarded as a departure from the invention, and all such modifications are intended to be included within the scope of the invention.

We claim:

1. A method for inter-base station signaling, comprising:
receiving, at a first base station, first information from a second base station, the first information indicating commitments regarding transmission power by the second base station; and
determining, at the first base station, whether the second base station will follow the commitments indicated in the first information based on second information, the second information indicating for at least one of the first and second base stations which subframes in a series of subframes will be special subframes, each special subframe having at least one of less transmit power than a maximum transmission power and less data than a fully loaded subframe.

2. The method of claim 1, wherein the determining is based on pre-set rules stored at the first base station.

3. The method of claim 2, wherein the determining determines that the second base station will not follow the commitments indicated in the first information during the special subframes indicated by the second information.

4. The method of claim 2, wherein the first information includes a bit corresponding to each one of a plurality of physical resource blocks, each bit indicates whether the second base station will restrict transmission power below a threshold during the corresponding physical resource block; and
the second information includes a bit map, each bit in the bit map corresponding to respective one of the subframes in the series of subframes, and each bit indicating whether the corresponding subframe is a special subframe.

5. The method of claim 1, wherein the second infoi illation is received from the second base station, and the method further including,
scheduling, at the first base station, transmission to user equipment based on the first and second information.

6. The method of claim 1, further comprising:
receiving, at the first base station, third information, the third information indicating how to cooperatively handle the first and second information; and wherein
the determining determines whether the second base station will follow the commitments indicated in the first information based on the second information and the third information.

7. The method of claim 6, wherein
the first information includes a bit corresponding to each one of a plurality of physical resource blocks, each bit indicates whether the second base station will restrict transmission power below a threshold during the corresponding physical resource block; and
the second information includes a bit map, each bit in the bit map corresponding to respective one of the subframes in the series of subframes, and each bit indicating whether the corresponding subframe is a special subframe; and
the third information indicates whether to disregard restrictions indicated by the second information during the special subframes indicated by the first information.

8. The method of claim 6, wherein the second information is received from the second base station, and the method further including, scheduling, at the first base station, transmission to user equipment based on the first, second, and third information.

9. The method of claim 1, wherein the first base station is one of a macro cell base station and a small cell base station, and the second base station is one of a macro cell base station and a small cell base station.

10. The method of claim 1, wherein the receiving receives the first information over an X2 interface.

11. A method for inter-base station signaling, comprising:
sending, from a first base station, handling infoi illation to a second base station, the handling information indicating how to cooperatively handle first information and second information, the first information indicating commitments regarding transmission power by the first base station, the second information indicating for at least one of the first and second base stations which subframes in a series of subframes will be special subframes, each special subframe having at least one of less transmit power than a maximum transmission power and less data than a fully loaded subframe.

12. The method of claim 11, wherein the handling information indicates whether to disregard the second information during the special subframes.

13. The method of claim 11, wherein
the first information includes a bit corresponding to each one of a plurality of physical resource blocks, each bit indicates whether the second base station will restrict transmission power below a threshold during the corresponding physical resource block; and
the second information includes a bit map, each bit in the bit map corresponding to respective one of the subframes in the series of subframes, and each bit indicating whether the corresponding subframe is a special subframe; and
the handling information indicates whether to disregard restrictions indicated by the second information during the special subframes indicated by the first information.

14. The method of claim 1, wherein the first base station is one of a macro cell base station and a small cell base station, and the second base station is one of a macro cell base station and a small cell base station.

15. The method of claim 11, wherein the sending sends the handling information over an X2 interface.

16. A method for inter-base station signaling, comprising:
sending, at a first base station, first information to a second base station, the first information indicating commitments regarding transmission power by the first base station;

determining, at the first base station, whether to follow the commitments indicated in the first infoi illation based on second information, the second information indicating for the second base station which subframes in a series of subframes will be special subframes, each special subframe having at least one of less transmit power than a maximum transmission power and less data than a fully loaded subframe.

17. The method of claim 16, wherein the determining is based on pre-set rules stored at the first base station.

18. The method of claim 17, wherein the determining determines not to follow the commitments indicated in the first information during the special subframes indicated by the second information.

19. The method of claim 17, wherein
the first information includes a bit corresponding to each one of a plurality of physical resource blocks, each bit indicates whether the first base station will restrict transmission power below a threshold during the corresponding physical resource block; and
the second information includes a bit map, each bit in the bit map corresponding to respective one of the subframes in the series of subframes, and each bit indicating whether the corresponding subframe is a special subframe.

20. The method of claim 16, further comprising:
receiving, at the first base station, third information, the third information indicating how to cooperatively handle the first and second information; and wherein
the determining determines whether to follow the commitments indicated in the first information based on the second information and the third information.

21. The method of claim 20, wherein
the first information includes a bit corresponding to each one of a plurality of physical resource blocks, each bit indicates whether the first base station will restrict transmission power below a threshold during the corresponding physical resource block; and
the second information includes a bit map, each bit in the bit map corresponding to respective one of the subframes in the series of subframes, and each bit indicating whether the corresponding subframe is a special subframe; and
the third information indicates whether to disregard restrictions indicated by the first information during the special subframes indicated by the first information.

22. The method of claim 16, wherein the first base station is one of a macro cell base station and a small cell base station, and the second base station is one of a macro cell base station and a small cell base station.

23. The method of claim 16, wherein the receiving receives the first information over an X2 interface.

* * * * *